United States Patent
Yu et al.

(10) Patent No.: US 9,888,222 B2
(45) Date of Patent: Feb. 6, 2018

(54) METHOD AND DEVICE FOR GENERATING STEREOSCOPIC VIDEO PAIR

(71) Applicant: ZHEJIANG UNIVERSITY, Hangzhou, Zhejiang Province (CN)

(72) Inventors: Lu Yu, Hangzhou (CN); Yin Zhao, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 550 days.

(21) Appl. No.: 14/397,123

(22) PCT Filed: Apr. 24, 2013

(86) PCT No.: PCT/CN2013/000466
§ 371 (c)(1),
(2) Date: Oct. 24, 2014

(87) PCT Pub. No.: WO2013/159568
PCT Pub. Date: Oct. 31, 2013

(65) Prior Publication Data
US 2015/0334364 A1 Nov. 19, 2015

(30) Foreign Application Priority Data

Apr. 25, 2012 (CN) .......................... 2012 1 0125010

(51) Int. Cl.
*H04N 13/00* (2006.01)
*G06T 3/40* (2006.01)

(52) U.S. Cl.
CPC ........... *H04N 13/0011* (2013.01); *G06T 3/40* (2013.01); *H04N 13/0018* (2013.01); *H04N 2213/003* (2013.01); *H04N 2213/007* (2013.01)

(58) Field of Classification Search
CPC ....................... H04N 13/0018; H04N 13/0011
See application file for complete search history.

(56) References Cited

U.S. PATENT DOCUMENTS

| | | | |
|---|---|---|---|
| 6,476,850 B1 | 11/2002 | Erbey | |
| 2010/0026712 A1* | 2/2010 | Aliprandi | G06T 15/20 345/629 |
| 2017/0013255 A1* | 1/2017 | Newton | H04N 13/0018 |

FOREIGN PATENT DOCUMENTS

| | | |
|---|---|---|
| CN | 101742347 A | 6/2010 |
| CN | 102263977 A | 11/2011 |

(Continued)

*Primary Examiner* — William C Vaughn, Jr.
*Assistant Examiner* — Jerry Jean Baptiste
(74) *Attorney, Agent, or Firm* — Jiwen Chen

(57) ABSTRACT

The present invention discloses a method to generate a stereoscopic video pair which can be used in the field of multimedia communication. A stereoscopic video pair can be obtained after processing a stereoscopic video sequence by using display auxiliary information. The stereoscopic video pair is displayed on a stereoscopic display D1. The display auxiliary information comprises camera viewpoint position information, virtual viewpoint position information and display scaling factor S1. The camera viewpoint position information indicates the position of a camera viewpoint C of a three-dimensional video sequence. The virtual viewpoint position information indicates the position of a virtual viewpoint P1. The display scaling factor S1 indicates the ratio of horizontal resolution Res1 to horizontal width W1 of the stereoscopic display D1, i.e., S1=Res1/W1, where the horizontal width is the approximation of actual display screen width. The present invention also discloses the corresponding stereoscopic video pair generation apparatus. The present invention can improve visual experience of stereoscopic viewing.

16 Claims, 2 Drawing Sheets

(56) References Cited

FOREIGN PATENT DOCUMENTS

| CN | 102325259 A | 1/2012 |
|---|---|---|
| JP | 2011151676 A | 8/2011 |

* cited by examiner

METHOD AND DEVICE FOR GENERATING STEREOSCOPIC VIDEO PAIR

This is a U.S. national stage application of PCT Application No. PCT/CN2013/000466 under 35 U.S.C. 371, filed Apr. 24, 2013 in Chinese, claiming the priority benefit of Chinese Application No. 201210125010.9, filed Apr. 25, 2012, which is hereby incorporated by reference.

TECHNICAL FIELD

The present invention involves the field of multimedia communication, more specifically a stereoscopic video pair generation method and apparatus.

BACKGROUND OF THE INVENTION

A three-dimensional (3D) video sequence comprises multiple (usually two-view) video sequences (corresponding to texture information), corresponding depth sequences (corresponding to depth information), which are usually called MVD (multi-view video plus depth). Each video sequence, which is usually captured by one camera, is called a camera viewpoint video sequence, and the corresponding viewpoint is called camera viewpoint. The three-dimensional video sequence also comprises information regarding the camera parameters of each viewpoint etc. A virtual viewpoint video sequence can be generated by the technique of view synthesis, and the corresponding viewpoint is called virtual viewpoint. Conventional binocular stereoscopic video consists of two fixed viewpoint video sequences (left view and right view), which is also called a stereoscopic pair. Stereoscopic pair captured by a stereo camera may have the problem that the view disparity between two-view images is too large. Viewing these stereoscopic video will cause serious visual fatigue. In other words, these stereoscopic videos are not suitable for stereoscopic viewing. After the introduction of the virtual viewpoint video sequence, a stereos pair for more suitable stereoscopic viewing can be generated by one view of a stereoscopic video and a synthesized virtual view. For different displays (e.g., different resolution or different width), the same N-pixel disparity corresponds to different depth feelings.

A virtual viewpoint video sequence can be generated by view synthesis technology. View synthesis technology uses a depth-image-based rendering (DIBR) method to project pixels in a camera viewpoint image to another virtual viewpoint and generate a projection image, based on depth values of the pixels and the corresponding camera parameters (e.g., focal length and coordinate positions of each viewpoint). Then methods including hole filling, filtering and resampling are used to generate one or more virtual viewpoint video sequences for final displaying. In view synthesis, a virtual viewpoint image can also be generated based on images of multiple camera viewpoints, called view merging. Then, the hole filling, filtering and resampling and other steps are applied on the merged image to generate a virtual viewpoint video sequences for displaying.

A stereos pair comprises two video sequences, the left viewpoint video sequence (for the left eye) and the right viewpoint video sequence (for the right eye). In order to improve the stereoscopic experience when viewing a stereo pair, it is common to adjust the parallax range presented on the display, by shifting stereos pair horizontally. When the left viewpoint image (i.e., image of the left viewpoint video sequence) is shifted to the right with respect to the right view image (i.e., image of the right viewpoint video sequence), the negative parallax increases and the positive parallax decreases. When the left viewpoint image is shifted to the left with respect to the right viewpoint image, the negative parallax decreases and the positive parallax increases. For instance, to shift the left viewpoint image by N pixels to the right direction with respect to right viewpoint image, the typical/common method is copying the pixels from column i to column i+N/2 one by one in the left viewpoint image and copying pixels from column i to column i−N/2 in the right viewpoint image, or keeping the right viewpoint image unchanged and copying pixels from column i to column i+N in the left viewpoint image. Shifting the left viewpoint image by N pixels to the left with respect to the right viewpoint image is similar.

The physical resolution of a display screen, i.e., the physical resolution of the pixels on the display panel, is an intrinsic parameter of the display, which indicates the maximum numbers of pixels that are supported to be displayed in horizontal and vertical directions. A display screen does not have to be operated under the maximum resolution determined by the physical resolution. For example, a display of physical resolution of 1920*1080 can be operated under other resolution such as 1600*900 or 1024*768. Therefore, the working resolution of a display is the screen resolution when the display is operated, but may not be the physical resolution of the display. In applications such as TV and movie, input images are shown in a full-screen mode, and in this case, the actually effective horizontal width (or actual width) or horizontal size is equal to the physical width of the display. If the input image resolution, i.e., the numbers of pixels in horizontal and vertical directions of an image input to the display, is lower than the current working resolution of the display, then the display may usually up-sample the image and scale it to a full-screen size for displaying (often called extended display). Under such circumstance, the content shown on the display corresponds to all pixels of an input image. Thus, the working resolution of the display can be considered as the resolution of the input image, instead of the physical resolution or working resolution of the display. If the resolution of the input image is higher than the working resolution of the display, then the display may usually down-sample the input image and scale it to a full-screen size for displaying. Under such circumstance, the content shown on the display also corresponds to all the pixels of an input image. Thus, the working resolution of the display can also be considered as the resolution of the input image.

However, in certain applications, such as "picture in picture" and displaying in a window mode, input images are not displayed in full screen; instead, the input image is displayed in a region of the screen, according to the actual resolution of the display under that operating status. For example, the region may be a rectangle region around screen center or close to the bottom-right corner of the screen. Therefore, the actual width of a display can be uniformed described as the physical width of the region where the image is being displayed, while the actual resolution of a display can be regarded as the resolution of the input image. In addition, in some displaying applications, a region of width X on the screen is only displayed with a part of the input image, denoted as Y, where the number of pixels in horizontal direction of Y is denoted as M. Under such circumstance, the actual width of the display can be regarded as the width X of the image displaying region, and the actual horizontal resolution of the display is the number of pixels in the horizontal direction of Y, which is M. The above-mentioned width can also be replaced by an approximation value, apart from using a highly precise value. For instance, it is acceptable that the error of an approximation value compared with the actual width does not exceed 10%.

In summary, to unify and simplify the description, in the present invention, resolution is denoted as the numbers of pixels in horizontal and vertical directions; the actual resolution of a display is referred to the resolution of the region that is used to display the image; the actual width or horizontal size of a display is referred to the physical width of the region that is used to display the image in actual. Specifically, when the resolution of the input image is equal to the physical resolution of the display, the working resolution of the display is equal to the physical resolution of the display, and the image is displayed in full screen, the actual resolution of the display is equal to the physical resolution of the screen, and the actual width of the display is equal to the physical width of the display.

SUMMARY OF THE INVENTION

In order to overcome the technical defects of prior art, an object of the present invention is to processes the reconstructed three-dimensional video sequence according to the display auxiliary information, to obtain a stereoscopic video pair which is suitable for viewing on a target display, and ultimately to improve the visual experience of three-dimension display.

The first technical solution of the present invention is to provide a generation method of stereoscopic video pair. According to this method, a stereoscopic video pair is obtained by processing a three-dimensional video sequence using display auxiliary information; the stereoscopic video pair is displayed on a stereoscopic display D1;

The display auxiliary information comprises camera viewpoint position information, virtual viewpoint position information and display scaling factor S1;

The camera viewpoint position information indicates a camera viewpoint position C of the three-dimensional video sequence;

The virtual viewpoint information indicates the position of a virtual viewpoint P1; The display side scaling factor S1 indicates the ratio of the horizontal resolution Res1 to the horizontal width W1 of the stereoscopic display D1, i.e., S1=Res1/W1, the horizontal width is an approximation of actual screen width of the display D1;
The stereoscopic video pair is obtained by processing a three-dimensional video sequence comprising the steps of:

1) Choosing the video sequence of the viewpoint C of the three-dimensional video sequence as a video sequence V1 of the stereoscopic video pair;

2) Determining a virtual viewpoint P2, and synthesizing a virtual viewpoint video sequence of the virtual viewpoint P2 as a video sequence V2 of the stereoscopic video pair. The virtual viewpoint P2 is on the line between the camera viewpoint C and the virtual viewpoint P1, and its distance to the camera viewpoint C is S1/K times of the distance between the camera viewpoint C and virtual viewpoint P1, where K is a constant.

As an option, the display auxiliary information further comprises image shifting information, the image shifting information indicates the number of pixels X shifted horizontally in images of the two video sequences of the stereoscopic video pair that is constituted by the C and P1 viewpoint video sequences;

The method of "obtaining a stereoscopic video pair by processing a three-dimensional video sequence" further comprises shifting images of the two video sequence images of the stereoscopic video horizontally, and the shifting pixel number X' is S1/K times of the shifting pixel number X, i.e., X'=XS1/K.

The second technical solution of the present invention is to provide a stereoscopic video pair generation method. According to this method, a stereoscopic video pair is obtained through the processing of a three-dimensional video sequence using display auxiliary information; the stereoscopic video pair is displayed on a stereoscopic display D1;

The display auxiliary information comprises camera viewpoint position information, virtual viewpoint position information, display scaling factor S1 and source scaling factor S2;

The camera viewpoint position information comprises the position of a camera viewpoint C of the three-dimensional video sequence.

The virtual viewpoint position information indicates the position of a virtual viewpoint P1; The display scaling factor S1 indicates the ratio of the horizontal resolution Res1 to the horizontal width W1 of the stereoscopic display D1, i.e., S1=Res1/W1;

The source scaling factor S2 indicates the ratio of the horizontal resolution Res2 to the horizontal width W2 of the stereoscopic display D2, i.e., S2=Res2/W2;

The stereoscopic video pair is obtained by processing a three-dimensional video sequence comprises the steps of:

1) Choosing the video sequence of the viewpoint C of the three-dimensional video sequence as a video sequence V1 of the stereoscopic video pair;

2) Determining a virtual viewpoint P2, and synthesizing the virtual viewpoint video sequence of the synthesized virtual viewpoint P2 as a video sequence V2 of the stereo pair. The virtual viewpoint P2 is on the line between the camera viewpoint C and the virtual viewpoint P1, whose distance to the camera viewpoint C is S1/S2 times of the distance between the camera viewpoint C and virtual viewpoint P1.

As an option, the display auxiliary information also comprises image shifting information, the image shifting information indicates the shifting pixel number X shifted horizontally in the two video sequences images of the stereoscopic video pair that is constituted by the C and P1 viewpoint video sequences;

The method of "obtaining a stereoscopic video pair by processing a three-dimensional video sequence" further comprises shifting the two video sequence images of the stereoscopic video horizontally, and the shifting pixel number X' is S1/K times of the shifting pixel number X, i.e., X'=XS1/S2.

The third technical solution of the present invention is to provide a stereoscopic video pair generation apparatus, which comprises the follow two modules:

A camera viewpoint video sequence selection module, whose input comprises a three-dimensional video sequence and camera viewpoint position information, where the camera viewpoint position information indicates one camera viewpoint C's position of the three-dimensional video sequence; the output of the camera viewpoint video sequence selection module comprises one video sequence V1 of the stereoscopic pair; the camera viewpoint video sequence selection module accomplishes the processing that includes choosing the viewpoint C of the three-dimensional video sequence as one video sequence V1 of the stereoscopic video pair;

A virtual viewpoint video sequence synthesis module, whose input comprises three-dimensional video sequence, the virtual viewpoint position information and the display scaling factor S1; where the virtual viewpoint position information indicates the position of a virtual viewpoint P1; The display scaling factor S1 is the ratio of the horizontal resolution Res1 and the horizontal width W1, i.e., S1=Res1/W1; the output of the virtual viewpoint video sequence synthesis module comprises one video sequence V2 of the stereoscopic pair; the virtual viewpoint video sequence synthesis module accomplishes the processing that comprises determining a virtual viewpoint P2 and synthesizing the virtual viewpoint video sequence of the virtual viewpoint P2 as the video sequence V2 of the stereoscopic video pair; The virtual viewpoint P2 is on the line between the camera viewpoint C and the virtual viewpoint P1, and the distance between the virtual viewpoint P2 and the camera view point C is S1/K times of that between the camera view point C and the virtual viewpoint P1, where K is a constant.

As an option, the stereoscopic video generation apparatus further comprises an image shifting module. Its input comprises a stereoscopic video pair comprising stereoscopic video pair constituted by the video sequence V1 and the video sequence V2, the display scaling factor S1, and the image horizontal shifting information. The image shifting information indicates the shifting pixel number X shifted horizontally in the two video sequences images of the stereoscopic video pair that is constituted by the C and P1 viewpoint video sequences. Its output comprises a stereoscopic video pair Q2 after horizontal shifting processing. The processing accomplished by the image shifting module comprises shifting the images of the two video sequences of the stereoscopic video pair, and shifting pixel number X' is S1/K times of the shifting pixel number X, i.e., X'=XS1/K.

The fourth technical solution of the present invention is to provide a stereoscopic video pair generation apparatus, which comprises the following two modules:

A camera viewpoint video sequence selection module, whose input comprises three-dimensional video sequence and camera viewpoint position information, where the camera viewpoint information indicates the position of a camera viewpoint C of three-dimensional video sequence; its output contains a video sequence V1 of stereoscopic video pair; the processing completed by the camera viewpoint video sequence selection module comprises selecting the video sequence of the viewpoint C of the three-dimensional video sequence as a video sequence V1 of the stereoscopic video pair;

A virtual viewpoint video sequence synthesis module, whose input comprises the three-dimensional video sequence, virtual viewpoint position information, display scaling factor S1, source scaling factor S2, where the virtual viewpoint position information indicates the position of a virtual viewpoint P1, the display scaling factor S1 is the ratio of horizontal resolution Res1 and horizontal width W1 of the stereoscopic display D1, S1=Res1/W1, the source scaling factor S2 is the ratio of horizontal resolution Res2 and horizontal width W2 of the stereoscopic display D2, i.e., S2=Res2/W2; the output of the virtual viewpoint video sequence synthesis module comprises a video sequence V2 of stereoscopic video pair; the processing completed by the virtual viewpoint video sequence synthesis module comprises determining a virtual viewpoint P2 and synthesizing the video sequence of virtual viewpoint P2 as a video sequence V2 of the stereoscopic video pair, the virtual viewpoint P2 is on the line between the camera viewpoint C and virtual viewpoint P1, and the distance between the virtual viewpoint P2 and the camera viewpoint C is S1/S2 times of the distance between the camera viewpoint C and the virtual viewpoint P1.

As an option, the stereoscopic video generation apparatus further comprises an image shifting module, whose input comprises a stereoscopic video pair Q1 comprising the video sequence V1 and the video sequence V2, the display scaling factor S1, the source scaling factor S2, and the image horizontal shifting information. The image shifting information indicates the shifting pixel number X shifted horizontally in the two video sequences images of the stereoscopic video pair that is constituted by the C and P1 viewpoint video sequences, whose output includes a stereoscopic video pair after shifting processing; The processing which is accomplished by the image shifting module comprises shifting the images of two video sequences of a stereoscopic video pair, in which the shifting pixel number X' is S1/S2 times of the shifting pixel number X, i.e., X'=XS1/S2.

The beneficial effect of the present invention, compared with prior art technology, is that the stereoscopic video pair generation method and apparatus of the present invention provide a stereoscopic video sequence suitable for binocular stereo viewing, which is based on the parameters of the display device, and hence it ultimately improves the visual experience of the displayed three-dimensional video.

BRIEF DESCRIPTION OF THE DRAWINGS

With reference to the following figures, the other features and advantages of the present invention will be clearer through the following description of the embodiments, which are explained according to the principle of the present invention.

DETAILED DESCRIPTION OF INVENTION

Figure 1:
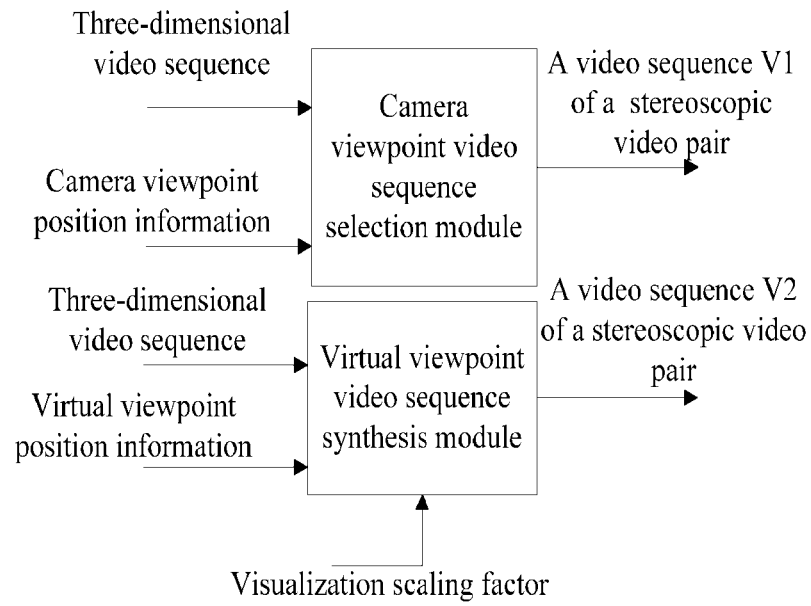
FIG. 1 is a framework diagram of stereoscopic video pair generation apparatus of the present invention's embodiment.

Details of the present invention are described with reference to the embodiments combined with attached figures as follows: The display auxiliary information comprises camera viewpoint position information, virtual viewpoint position information, and display scaling factor S1;

The camera viewpoint position information indicates the position of a camera viewpoint C of a three-dimensional video sequence;

The virtual viewpoint position information indicates the position of a virtual viewpoint P1;

The display scaling factor S1 is the ratio of the horizontal resolution Res1 to the horizontal width W1 of a stereoscopic display D1 for displaying a stereo video, i.e., S1=Res1/W1; the horizontal width is an approximation of the actual screen width of the display D1.

The display auxiliary information may further comprises either a source scaling factor S2 or shifting pixel information, or both of them;

The source scaling factor S2 is the ratio of the horizontal resolution Res2 to the horizontal width W2 of a stereoscopic display D2, i.e., S2=Res2/W2;

The image shifting information is a shifting pixel number X by which images of two video sequences of the stereoscopic video pair are shifted horizontally.

Embodiment 1

The first embodiment of the present invention relates to a stereoscopic video pair generation method. According to the input display auxiliary information, a three-dimensional video sequence is processed and a stereoscopic video pair P is obtained for displaying on a stereoscopic display D1;

The display auxiliary information comprises camera viewpoint position information, virtual viewpoint position information, and display scaling factor S1;

The camera viewpoint position information indicates the position of a camera viewpoint C of the three-dimensional video sequence;

The virtual viewpoint position information indicates the position of a virtual viewpoint P1; The display scaling factor S1 is the ratio of the horizontal resolution Res1 to the horizontal width W1 of the stereoscopic display D1 for displaying a stereoscopic video pair, i.e., S1=Res1/W1; the horizontal width is an approximation of the actual screen width of the display.

The method of processing the three-dimensional video sequence and obtaining a stereoscopic video pair comprises the following steps:

1) choosing video sequence of the viewpoint C instructed by the camera viewpoint position information of the three-dimensional video sequence to be a video sequence V1 of the stereoscopic video pair;

2) determining a virtual viewpoint P2, and synthesizing a virtual viewpoint video sequence of the virtual viewpoint P2 to be a video sequence V2 of the stereoscopic video pair; the virtual viewpoint P2 is on the line between the camera viewpoint C and virtual viewpoint P1, and the distance between the virtual viewpoint P2 and the camera viewpoint C is S1/K times of the distance between the camera viewpoint C and virtual viewpoint P1, where K is a constant. That is, the vector Vec2 composed by P2 and C is S1/K times of the vector Vec1 composed by P1 and C (i.e., Vec2=Vec1S1/K). K may be the ratio of the horizontal resolution Res3 to the horizontal width W3 of a pre-defined display D3, i.e., K=Res3/W3, where the horizontal width W1 and W3 are approximations of horizontal screen widths of displays D1 and D3, respectively (for example, the approximation error is less than 10%, i.e., the actual screen horizontal width difference between W1 and D1 or between W3 and D3 is less than 10% of the actual horizontal screen width). For example, if the actual horizontal width of the display screen is 1103, the approximated value can be 1100 or 1050 etc. The Res3 and W3, can be, for example, Res3=1920, W3=1000 cm, or Res3=1920, W3=1100 cm, or Res3=1680, W3=500 cm.

The viewpoint synthesis processing which synthesizes a virtual viewpoint video sequence at virtual viewpoint P2, may use the depth-image-based rendering (DIBR) technique, which projects pixels of a camera view image to another virtual view based on corresponding depth values and camera parameters (for example, each viewpoint's focal length, coordinate position etc.), thereby generating a projection image, and then through processing like hole filling, filtering, and resampling, generates final virtual viewpoint video sequence for displaying. In viewpoint synthesis, a virtual view image can also be synthesized based on several camera viewpoints. More specifically, first the image of several camera viewpoints of a three-dimensional video sequence was projected to the virtual viewpoint, the projected images, called view merging, were merged; then further processing, such as hole filling, filtering, resampling etc., were conducted on the merged image, through which a virtual viewpoint video sequence for displaying is obtained.

Embodiment 2

The second embodiment of the present invention relates to a stereoscopic video pair generation method. Different from the method in the embodiment 1, the display auxiliary information also comprises a source scaling factor S2; the source scaling factor S2 is the ratio of the horizontal resolution Res2 to the horizontal width W2 of a stereoscopic display D2, i.e., S2=Res2/W2. The source scaling factor is usually set up when the video content is generated. The stereoscopic display D2 can be a stereoscopic display of a recommended size. For example, for a three-dimensional video sequence displayed on cellphones, D2 may be a 5-inch screen; or for a three-dimensional video sequence for home entertainment, D2 may be a 47-inch screen. The horizontal width W2 is an approximation of horizontal screen width of display D2.

The method of processing the three-dimensional video sequence and obtaining a stereoscopic video pair comprises the following steps:

1) choosing video sequence of the viewpoint C of the three-dimensional video sequence as a video sequence V1 of the stereoscopic video pair;

2) determining a virtual viewpoint P2, and synthesizing a virtual viewpoint video sequence of the virtual viewpoint P2 as a video sequence V2 of the stereoscopic video pair; where the virtual viewpoint P2 is on the line between the camera viewpoint C and virtual viewpoint P1, and the distance between the virtual viewpoint P2 and the camera viewpoint C is S1/S2 times of the distance between the camera viewpoint C and the virtual viewpoint P1.

Embodiment 3

The third embodiment of the present invention relates to a stereoscopic video pair generation method. Based on the input display auxiliary information, a three-dimensional video sequence is processed and a stereoscopic video pair is obtained for being displayed on a stereoscopic display D1;

The display auxiliary information comprises camera viewpoint position information, virtual viewpoint position information, display scaling factor S1 and image shifting information;

The camera viewpoint position information indicates the position of a camera viewpoint C of a three-dimensional video sequence;

The virtual viewpoint position information indicates the position of a virtual viewpoint P1;

The display scaling factor S1 is the ratio of the horizontal resolution Res1 to the horizontal width W1 of a stereoscopic display D1, i.e., S1=Res1/W1;

The image shifting information is the number of pixels X shifted horizontally in images of the two video sequences of the stereoscopic video pair that is constituted by the C and P1 viewpoint video sequences.

The method of processing the three-dimensional video sequence and obtaining a stereoscopic video pair comprises the following steps:

1) choosing video sequence of the viewpoint C of the three-dimensional video sequence to be a video sequence V1 of the stereoscopic video pair;

2) determining a virtual viewpoint P2, and synthesizing a virtual viewpoint video sequence of the virtual viewpoint P2 to be a video sequence V2 of the stereoscopic video pair; where the virtual viewpoint P2 is on the line between the camera viewpoint C and virtual viewpoint P1, and the distance between the virtual viewpoint P2 and the camera viewpoint C is S1/K times of the distance between the camera viewpoint C and virtual viewpoint P1, where K is a pre-defined constant. In other words, the vector Vec2 composed by P2 and C is S1/K times of the vector Vec1 composed by P1 and C (i.e., Vec2=Vec1S1/K). K can be the ratio of the horizontal resolution Res3 to the horizontal width W3 of a pre-defined display D3, i.e., K=Res3/W3. For example Res3=1024, W3=300 cm, or Res3=1280, W3=375 cm.

3) horizontally shifting images of two video sequences of a stereoscopic video pair, and the shifting pixel number X' is S1/K times of the shifting pixel number X, where K is a constant, i.e., X'=XS1/K. When X' calculated by X'=XS1/K is not an integer, then X' is rounded to an integer. A positive X' indicates that the left-viewpoint image (i.e., the images in the left-viewpoint video sequence) is shifted by X' pixels to the right (or left) relative to the right-viewpoint image; a negative X' indicates that the left-viewpoint image is shifted by X' pixels to the left (or right) relative to the right-viewpoint image. Take shifting left-viewpoint image by N (N is an integer) pixels to the right relative to the right-viewpoint image as an example, three usual ways are as follows, 1) sequentially copying pixels of column i to column i+N/2 in the left-viewpoint image (from left to right), and meanwhile sequentially copying pixels of column i to column i−N/2 in the right-viewpoint image;

2) keeping the right-viewpoint image unchanged, and copying pixels of column i to column i+N in the left-viewpoint image;

3) keeping the left-viewpoint image unchanged, then copying pixels of column i to column i+N in the right-viewpoint image.

Shifting the left-viewpoint image by N pixels to the left relative to the right-viewpoint is similar to the methods described above.

Embodiment 4

The fourth embodiment of the present invention relates to a stereoscopic video sequence generation method. The differences between the method and the method in embodiment 3 are that the display auxiliary information which further comprises source scaling factor S2; where the source scaling factor S2 is the ratio of the horizontal resolution Res2 to the horizontal width W2 of a stereoscopic display D2, i.e., S2=Res2/W2;

The method of processing the three-dimensional video sequence and obtaining a stereoscopic video pair comprises the following steps:

1) choosing video sequence of the viewpoint C of the three-dimensional video sequence as a video sequence V1 of the stereoscopic video pair;

2) determining a virtual viewpoint P2, and choosing a virtual viewpoint video sequence synthesized at virtual viewpoint P2 as a video sequence V2 of the stereoscopic video pair; the virtual viewpoint P2 is on the line between the camera viewpoint C and virtual viewpoint P1, and the distance between the virtual viewpoint P2 and the camera viewpoint C is S1/S2 times of the distance between the camera viewpoint C and the virtual viewpoint P1;

3) horizontally shifting images of two video sequence of the stereoscopic video pair, where the number of pixels X' being shifted by is S1/S2 times of the shifting pixel number X, i.e., X'=XS1/S2. If X' calculated by X'=XS1/S2 is not an integer, X' can be further rounded to an integer.

Embodiment 5

The fifth embodiment of the present invention relates to a stereoscopic video sequence generation apparatus. FIG. 1 is a framework diagram of stereoscopic video pair generation apparatus. This apparatus comprises two modules:

1) a camera viewpoint video sequence selection module, whose input comprises a three-dimensional video sequence and the camera viewpoint position information. The camera viewpoint position information indicates one camera viewpoint C of the three-dimensional video sequence. The output of the camera viewpoint video sequence choosing module comprises the video sequence of the camera viewpoint C, which is one video sequence V1 of the stereoscopic video pair. The camera viewpoint video sequence selection module accomplishes the same functionality as that in the above-mentioned embodiment, i.e., choosing the viewpoint C of the three-dimensional video sequence to be one video sequence V1 of the stereoscopic video sequence pair.

2) a virtual viewpoint sequence synthesis module, whose input involves the three-dimensional video sequence, virtual viewpoint position information and the display scaling factor S1. The virtual viewpoint position information indicates position of one virtual viewpoint P1. The display scaling factor S1 is the ratio of the horizontal resolution Res1 to the horizontal width W1 of a stereoscopic display D1, i.e., S1=Res1/W1. The output of the virtual viewpoint sequence synthesis module comprises one video sequence which is a video sequence V2 of the stereoscopic pair. The virtual viewpoint sequence synthesis module accomplishes the processing that comprises determining a virtual viewpoint P2, and synthesizing a virtual viewpoint video sequence at virtual viewpoint P2 as a video sequence V2 of the stereoscopic video pair, which is the same as that described in the above-mentioned stereoscopic pair generating method. The virtual viewpoint P2 is on the line through the camera viewpoint C and the virtual viewpoint P1, and the distance from the viewpoint P2 to the camera viewpoint C is S1/K times of the distance between the camera viewpoint C and the virtual viewpoint P1, where K is a constant, such as K=1.92 or K=1.

Embodiment 6

Figure 2:
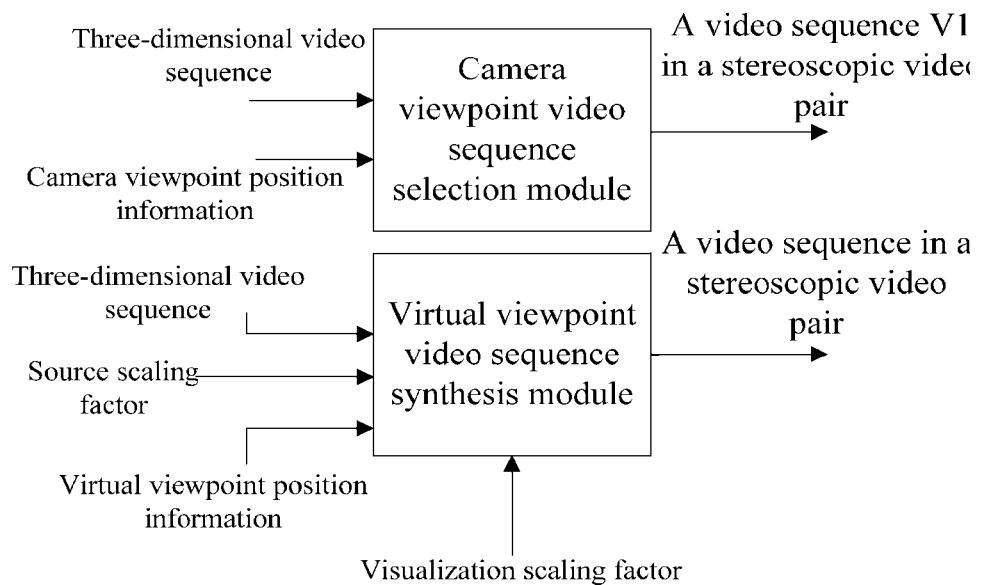
FIG. 2 is another framework diagram of stereoscopic video pair generation apparatus of the present invention's another embodiment.

The sixth embodiment of the present invention relates to a stereoscopic video sequence generation apparatus. FIG. 2 is a second framework diagram of stereoscopic video pair generation apparatus. The differences between this apparatus and the apparatus in embodiment 5 lie on the following two aspects:

1) The input of the virtual viewpoint video sequence synthesis module further comprises a source scaling factor S2. The source scaling factor S2 is the ratio of the horizontal resolution Res2 to the horizontal width W2 of the stereoscopic display D2, i.e., S2=Res2/W2;

2) The virtual viewpoint video sequence synthesis module accomplishes functionality similar to that described in the stereoscopic video pair generating method, i.e., determining one virtual viewpoint P2 and synthesizing a virtual viewpoint video sequence at viewpoint P2 as one video sequence V2 of the stereoscopic video pair, except that the virtual viewpoint P2 is on the line through the camera viewpoint C and the virtual viewpoint P1, and the distance from viewpoint P2 to the camera viewpoint C is S1/S2 times of the distance between the camera viewpoint C and the virtual viewpoint P1.

Embodiment 7

Figure 3:
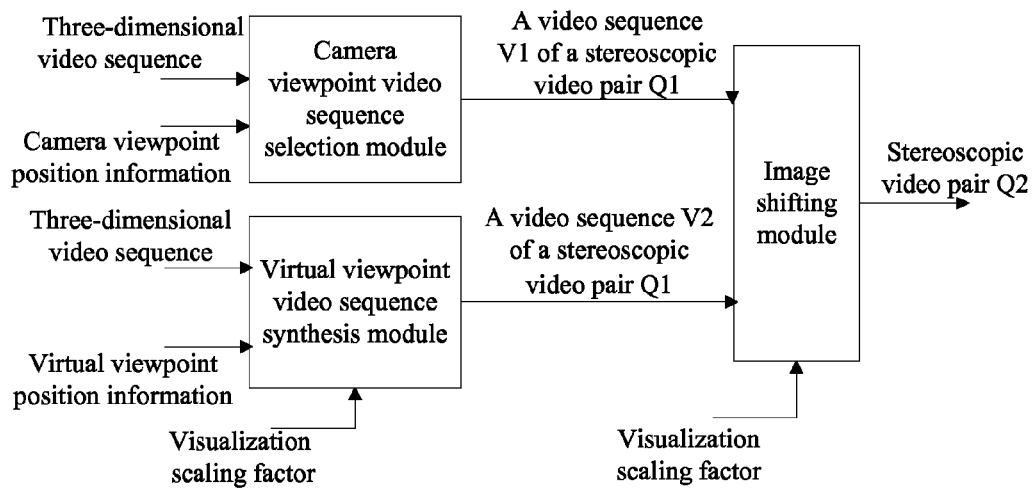
FIG. 3 is a third framework diagram of stereoscopic video pair generation apparatus of the present invention's a further embodiment.

The seventh embodiment of the present invention relates to a stereoscopic video sequence generation apparatus. FIG. 3 is a third framework diagram of stereoscopic video pair generation apparatus. This apparatus comprises the following three modules:

1) a camera viewpoint video sequence selection module, whose input comprises a three-dimensional video sequence and camera viewpoint position information. The camera viewpoint information indicates the position of a camera viewpoint C of the three-dimensional video sequence. The output of the camera viewpoint video sequence selection module comprises video sequence of the camera viewpoint C which is a video sequence V1 of the stereoscopic video pair; the functionality and implementation method of the camera viewpoint video sequence selection module are the same as the functionality and implementation method of the above-mentioned stereoscopic video pair generation method, which is choosing the video sequence of the viewpoint C of the three-dimensional video sequence to be a video sequence V1 of the stereoscopic video pair.

2) a virtual viewpoint video sequence synthesis module, whose input comprises the three-dimensional video sequence, virtual viewpoint position information and display scaling factor S1. The virtual viewpoint position information indicates the position of a virtual viewpoint P1. The display scaling factor S1 indicates the ratio of horizontal resolution Res1 to the horizontal width W1 of the stereoscopic display D1, i.e., S1=Res1/W1. The functionality and implementation method of the virtual viewpoint video sequence synthesis module are the same as the functionality and implementation method described in the above-mentioned stereoscopic video pair generation method, which is determining a virtual viewpoint P2 and synthesizing the virtual video sequence of virtual viewpoint P2 as a video sequence of the stereoscopic video pair; the virtual viewpoint P2 is on the line between the camera viewpoint C and virtual viewpoint P1, whose distance to camera viewpoint C is S1/K times of the distance between the camera viewpoint C and virtual viewpoint P1, where K is a constant.

3) an image shifting module, whose input comprises a stereoscopic video pair Q1 consisting of the video sequence V1 and video sequence V2, and also a display scaling factor S1 and image shifting information. The image shifting information indicates the number of pixels X shifted horizontally in images of the two video sequences of the stereoscopic video pair that is constituted by the C and P1 viewpoint video sequences. Its output comprises a stereoscopic video pair Q2 after horizontal shifting processing. The function and implementation method of the image shifting module are the same as the function and implementation method described in the above-mentioned stereoscopic video pair generation method, wherein the two images of the stereoscopic video pair are horizontally shifted and the shifting pixel number X' is S1/K times of the shifting pixel number X, where K is a constant, and X is an integer,  i.e., X'=XS1/K. If X' is not an integer after calculation X'=XS1/K, then X' is rounded to be an integer.

Embodiment 8

Figure 4:
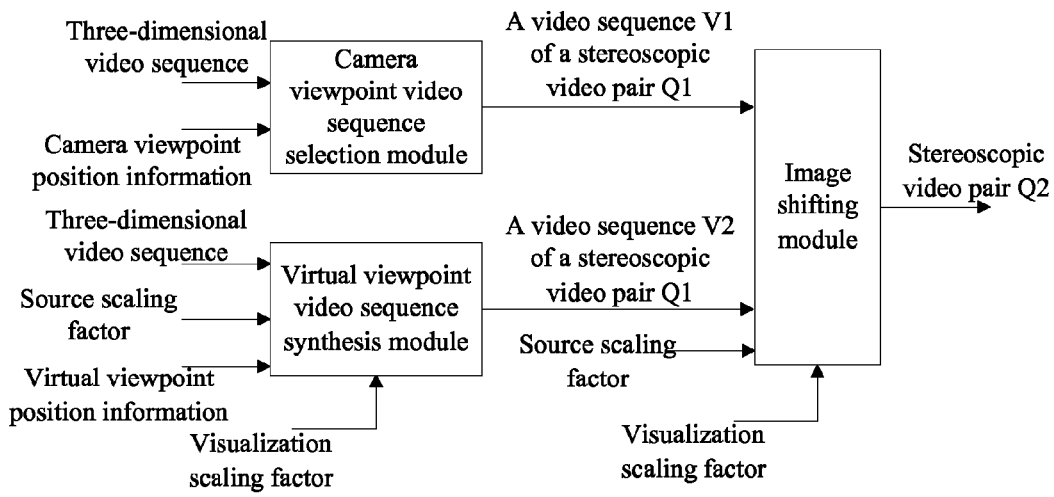
FIG. 4 is a forth framework diagram of stereoscopic video pair generation apparatus of the present invention's a still further embodiment.

The eighth embodiment of the invention relates to a stereoscopic video pair generation apparatus. FIG. 4 is a framework diagram of another embodiment of the stereoscopic video pair generation apparatus. The differences between the apparatus and the apparatus in embodiment 7 are as the following four points:

1) The input of the virtual viewpoint video sequence synthesis module also comprises a source scaling factor S2; the source scaling factor S2 is the ratio of horizontal resolution Res2 to horizontal width W2 of a stereoscopic display D2, i.e., S2=Res2/W2;

2) The function and implementation method of the virtual viewpoint's video sequence synthesis module are the same as the function and implementation method of above-mentioned stereoscopic video pair generation method, which is determining a virtual viewpoint P2 and synthesizing a virtual video sequence of virtual viewpoint P2 to be a video sequence of the stereoscopic video pair, where the virtual viewpoint P2 is on the line between camera viewpoint C and virtual viewpoint P1, and its distance to camera viewpoint C is S1/S2 times of the distance between the camera viewpoint C and virtual viewpoint P1;

3) The input of the image shifting module also comprises the source scaling factor S2;

4) the function and implementation method of the image shifting module are the same as the function and implementation method of the above-mention stereoscopic video pair generation method, wherein the two images of the stereoscopic video pair are horizontally shifted and the shifting pixel number X' is S1/S2 times of the shifting pixel number X, where K is a constant, X is an integer, and X'=XS1/S2. If X' is not an integer after calculation X'=XS1/S2, then X' is rounded to be an integer.

The stereoscopic video generation apparatus can be implemented in a variety of ways, for instance:

Method 1: Implemented by software running on a computer whose functionality is the same as the stereoscopic video pair generation method.

Method 2: Implemented by software running on a single-chip microcomputer whose functionality is the same as the stereoscopic video pair generation method.

Method 3: Implemented by software running on a digital signal processor whose function is the same as the stereoscopic video pair generation method.

Method 4: Implemented by circuits whose function is the same as the stereoscopic video pair generation method.

There might exist other methods to implement the stereoscopic video sequence generation apparatus, not limited to the four schemes mentioned above.

Although the implementation methods are described combined with attached figures, ordinary technicians in this field can do any transformation or modification within the scope of the claims.

The invention claimed is:

1. A stereoscopic video pair generating method, wherein, based on auxiliary display information, processing a three-dimensional video sequence to obtain a stereoscopic video pair, where the stereoscopic video pair is displayed on a stereoscopic display D1;

the auxiliary display information comprises camera viewpoint position information, virtual viewpoint position information and display scaling factor S1;

the camera viewpoint position information indicates the position of a camera viewpoint C of a three-dimensional video sequence;

the virtual viewpoint information indicates the position of a virtual viewpoint P1;

the display scaling factor S1 is a ratio of horizontal resolution Res1 to horizontal width W1 of a stereoscopic display D1, which is represented by the formula: S1=Res1/W1;

the processing of a three-dimensional video sequence to obtain a stereoscopic video pair comprises:

1) choosing a video sequence of the camera viewpoint C of the three-dimensional video sequence as a video sequence V1 of the stereoscopic video pair;

2) determining a virtual viewpoint P2, and synthesizing a virtual viewpoint video sequence of the virtual point P2 as a video sequence V2 of the stereoscopic video sequence, where the virtual viewpoint P2 is on a line between the camera viewpoint C and the virtual viewpoint P1, and the distance between the virtual viewpoint P2 and the camera viewpoint C is S1/K times of the distance between the camera viewpoint C and virtual viewpoint P1, where K is a constant.

2. The stereoscopic video pair generating method according to claim 1, wherein, the auxiliary display information further comprises image shifting information, the image shifting information indicates a number of pixels shifted horizontally (shifting pixel number X) in images of the two video sequences of the stereoscopic video pair that is constituted by the C and P1 viewpoint video sequences;

the processing a three-dimensional video sequence to obtain a stereoscopic video pair further comprises shifting the images of two video sequences of the stereoscopic video horizontally, where shifting pixel number X' is S1/K times of the shifting pixel number X, which is represented by the formula: X'=XS1/K.

3. A stereoscopic video pair generating method, characterized by using auxiliary display information to process a three-dimensional video sequence to obtain the stereoscopic video pair, where the stereoscopic video pair is displayed on a stereo display D1;

the display auxiliary information comprises camera viewpoint position information, virtual viewpoint position information, display scaling factor S1 and source scaling factor S2;

the camera viewpoint position information indicates the position of a camera viewpoint C of a three-dimensional video sequence;

the virtual viewpoint position information indicates the position of a virtual viewpoint P1;

the display scaling factor S1 indicates a ratio of horizontal resolution Res1 to horizontal width of the stereoscopic display D1, which is represented by the formula: S1=Res1/W1;

the source scaling factor S2 indicates a ratio of horizontal resolution Res2 to horizontal width W2 of a stereoscopic display D2, which is represented by the formula: S2=Res2/W2;

the processing a three-dimensional video sequence to obtain a stereoscopic video pair comprises:

1) choosing the video sequence of the camera viewpoint C of the three-dimensional video sequence as a video sequence V1 of the stereoscopic video pair;

2) determining a virtual viewpoint P2, and synthesizing a virtual viewpoint video sequence of the virtual point P2 as a video sequence V2 of the stereoscopic video sequence, where the virtual viewpoint P2 is on a line between the camera viewpoint C and virtual viewpoint P1, and the distance between the virtual viewpoint P2 and the camera viewpoint C is S1/S2 times of the distance between the camera viewpoint C and virtual viewpoint P1.

4. The stereoscopic video pair generating method according to claim 3, wherein, the display auxiliary information further comprises image shifting information, the image shifting information indicates a number of pixels shifted horizontally (shifting pixel number X) in images of the two video sequences of the stereoscopic video pair that is constituted by the C and P1 viewpoint video sequences;

the processing of a three-dimensional video sequence to obtain a stereoscopic video pair further comprises shifting images of the two video sequences of the stereoscopic video pair horizontally where shifting pixel number X' is S1/S2 times of the shifting pixels number X, which is represented by the formula: X'=XS1/S2.

5. A stereoscopic video pair generating apparatus, comprising two modules:

a camera viewpoint video sequence selection module, whose input comprises a three-dimensional video sequence and camera viewpoint position information, where the camera viewpoint position information indicates one camera viewpoint C's position of the three-dimensional video sequences; output of the camera viewpoint video sequence selection module comprises one video sequence V1 of a stereoscopic pair; the camera viewpoint video sequence selection module accomplishes a processing that comprises choosing the viewpoint C of the three-dimensional video sequence as one video sequence V1 of the stereoscopic video pair;

a virtual viewpoint video sequence synthesis module, whose input comprises the three-dimensional video sequence, the position information of the virtual viewpoint and display scaling factor S1; where the virtual viewpoint position information indicates the position of a virtual viewpoint P1; the display scaling factor S1 is a ratio of horizontal resolution Res1 to horizontal width W1 of a stereoscopic display D1, which is represented by the formula: S1=Res1/W1; an output of the virtual viewpoint video sequence selection module comprises one video sequence V2 of the stereoscopic pair; the virtual viewpoint video sequence synthesis module accomplishes a processing that comprises determining a virtual viewpoint P2 and synthesizing a virtual viewpoint video sequence of virtual viewpoint P2 as the video sequence V2 of the stereoscopic video pair, the virtual viewpoint P2 is on a line between the camera viewpoint C and the virtual viewpoint P1 and the distance between the virtual viewpoint P2 and the camera viewpoint C is S1/K times of the distance between the camera viewpoint C and the virtual viewpoint P1, where K is a constant.

6. The stereoscopic video pair generating apparatus according to claim 5 further comprising an image shifting module, whose input comprises a stereoscopic video pair Q1 composed by the video sequence V1 and video sequence V2, the display scaling factor S1, and image shifting information; the image shifting information indicates a number of pixels shifted horizontally (shifting pixel number X) in images of the two video sequences of the stereoscopic video pair that is constituted by the C and P1 viewpoint video sequences; the output of the image shifting module contains a stereoscopic video pair Q2 after shifting processing; the processing accomplished by the image shifting module comprises horizontal shifting of the images in two video sequences where shifting pixels number X' is S1/K times of the shifting pixel number X, which is represented by the formula: X'=XS1/K.

7. A stereoscopic video pair generating apparatus comprising two modules:
   a camera viewpoint video sequence selection module, whose input comprises a three-dimensional video sequence and camera viewpoint position information; the camera viewpoint position information indicates one camera viewpoint C's position of the three-dimensional video sequence; an output of the camera viewpoint video sequence selection module comprises one video sequence V1 of the stereoscopic pair; the camera viewpoint video sequence selection module accomplishes the processing that comprises choosing the viewpoint C of the three-dimensional video sequence as one video sequence V1 of the stereoscopic video pair;
   a virtual viewpoint video sequence synthesis module, whose input comprises the three-dimensional video sequence, virtual viewpoint position information, display scaling factor S1 and source scaling factor S2, where the virtual viewpoint position information indicates the position of a virtual viewpoint P1, the display scaling factor S1 indicates a ratio of horizontal resolution Res1 to horizontal width W1 of a stereoscopic display D1, which is represented by the formula: S1=Res1/W1; the source scaling factor S2 indicates a ratio of horizontal resolution Res2 to horizontal width W2 of a stereoscopic display D2, which is represented by the formula: S2=Res2/W2; an output of the virtual viewpoint video sequence synthesis module comprises a video sequence of the stereoscopic video pair; the virtual viewpoint video sequence synthesis module accomplishes the processing that comprises determining a virtual viewpoint P2 and synthesizing a virtual viewpoint video sequence of the virtual viewpoint P2 as a video sequence V2 of the stereoscopic video pair; the virtual viewpoint P2 is on a line between the camera viewpoint C and virtual viewpoint P2, and the distance between the virtual viewpoint P2 and the camera viewpoint C is S1/S2 times of the distance between the camera viewpoint C and virtual viewpoint P1.

8. The stereoscopic video pair generating apparatus according to claim 7, wherein, further comprises an image shifting module, whose input comprises a stereoscopic video pair Q1 composed by the video sequence V1 and video sequence V2, display scaling factor S1, source scaling factor S2, and image shifting information; the image shifting information indicates a number of pixels shifted horizontally (shifting pixel number X) in images of the two video sequences of the stereoscopic video pair that is constituted by the C and P1 viewpoint video sequences, the output of the image shifting module comprises a shifted stereoscopic video pair Q2, where the image shifting module accomplishes the processing that comprises the horizontal shifting of images of two video sequences of the stereoscopic video pair, and shifting pixel number X' is S1/S2 times of the shifting pixel number X, which is represented by the formula: X'=XS1/S2.

9. A stereoscopic video pair generating method, wherein, based on auxiliary display information, processing a three-dimensional video sequence to obtain a stereoscopic video pair, where the stereoscopic video pair is displayed on a stereoscopic display D1;
the auxiliary display information comprises camera viewpoint position information, and virtual viewpoint position information;
the camera viewpoint position information indicates the position of a camera viewpoint C of a three-dimensional video sequence;
the virtual viewpoint information indicates the position of a virtual viewpoint P1;
the processing of a three-dimensional video sequence to obtain a stereoscopic video pair comprises:
   1) choosing the video sequence of the camera viewpoint C of the three-dimensional video sequence as a video sequence V1 of the stereoscopic video pair;
   2) determining a virtual viewpoint P2, and synthesizing a virtual viewpoint video sequence of the virtual point P2 as a video sequence V2 of the stereoscopic video sequence, where the virtual viewpoint P2 is on a line between the camera viewpoint C and the virtual viewpoint P1, and the distance between the virtual viewpoint P2 and the camera viewpoint C is S1/K times of the distance between the camera viewpoint C and virtual viewpoint P1, where K is a constant, and S1 is a display scaling factor which is a ratio of horizontal resolution Res1 to horizontal width W1 of the stereoscopic display D1.

10. The stereoscopic video pair generating method according to claim 9, wherein, the auxiliary display information further comprises image shifting information; the image shifting information indicates shifting pixel number X by which images of two video sequences at viewpoints C and P1 which form the stereoscopic video pair are shifted horizontally;
the processing of a three-dimensional video sequence to obtain a stereoscopic video pair further comprises shifting the images of two video sequences of the stereoscopic video horizontally, where shifting pixel number X' is S1/K times of the shifting pixel number X, which is represented by the formula: X'=XS1/K.

11. The stereoscopic video pair generating method characterized by using auxiliary display information for processing a three-dimensional video sequence to obtain a stereoscopic video pair, wherein the stereoscopic video pair is displayed on a stereo display D1;
the display auxiliary information comprises camera viewpoint position information, and virtual viewpoint position information;
the camera viewpoint position information indicates the position of a camera viewpoint C of a three-dimensional video sequence;
the virtual viewpoint position information indicates the position of a virtual viewpoint P1;
the processing of a three-dimensional video sequence to obtain a stereoscopic video pair comprises:
   1) choosing the video sequence of the camera viewpoint C of the three-dimensional video sequence as a video sequence V1 of the stereoscopic video pair;
   2) determining a virtual viewpoint P2, and synthesize a virtual viewpoint video sequence of the virtual point P2 as a video sequence V2 of the stereoscopic video sequence; the virtual viewpoint P2 is on a line between the camera viewpoint C and virtual viewpoint P1, and the distance between the virtual viewpoint P2 and the camera viewpoint C is S1/S2 times of the distance between the camera viewpoint C and virtual viewpoint P1, where S1 is a display scaling factor which indicates the ratio of the horizontal resolution Res1 to the horizontal width of the stereoscopic display D1, and S2 is a source scaling factor which indicates the ratio of the horizontal resolution Res2 to the horizontal width W2 of the stereoscopic display D2.

12. The stereoscopic video pair generating method according to claim 11, wherein, the display auxiliary information further comprises image shifting information, the image shifting information indicates the shifting pixel number X by which the images of two video sequences at viewpoints C and P1 of the stereoscopic video pair are shifted horizontally;

the processing of a three-dimensional video sequence to obtain a stereoscopic video pair further comprises shifting images of the two video sequences of the stereoscopic video pair horizontally where shifting pixel number X' is S1/S2 times of the shifting pixels number X, which is represented by the formula: X'=XS1/S2.

13. A stereoscopic video pair generating apparatus comprising two modules:

a camera viewpoint video sequence selection module, whose input comprises a three-dimensional video sequence and camera viewpoint position information, where the camera viewpoint position information indicates the position of one camera viewpoint C of the three-dimensional video sequences; an output of the camera viewpoint video sequence selection module comprises one video sequence V1 of a stereoscopic pair; the camera viewpoint video sequence selection module accomplishes the processing that comprises choosing the viewpoint C of the three-dimensional video sequence as one video sequence V1 of the stereoscopic video pair;

a virtual viewpoint video sequence synthesis module, whose input comprises the three-dimensional video sequence, and the position information of the virtual viewpoint; where the virtual viewpoint position information indicates the position of a virtual viewpoint P1; an output of the virtual viewpoint video sequence selection module comprises one video sequence V2 of the stereoscopic pair; the virtual viewpoint video sequence synthesis module accomplishes the processing that comprises determining a virtual viewpoint P2 and synthesizing a virtual viewpoint video sequence of virtual viewpoint P2 as the video sequence V2 of the stereoscopic video pair, the virtual viewpoint P2 is on a line between by the camera viewpoint C and the virtual viewpoint P1 and the distance between the virtual viewpoint P2 and the camera viewpoint C is S1/K times of the distance between the camera viewpoint C and the virtual viewpoint P1, where S1 is a display scaling factor which is a ratio of horizontal resolution Res1 to horizontal width W1 of the stereoscopic display D1, which is represented by the formula: S1=Res1/W1, and K is a constant.

14. The stereoscopic video pair generating apparatus according to claim 13 further comprising an image shifting module, whose input comprises a stereoscopic video pair Q1 composed by the video sequence V1 and video sequence V2, and image shifting information; the image shifting information indicates shifting pixel number X by which the images of two video sequences at viewpoints C and P1 of the stereoscopic video pair are shifted horizontally; an output of the image shifting module contains a stereoscopic video pair Q2 after shifting processing; the processing accomplished by the image shifting module comprises horizontal shifting of the images in two video sequences, where shifting pixels number X' is S1/K times of the shifting pixel number X, which is represented by the formula: X'=XS1/K.

15. A stereoscopic video pair generating apparatus comprising two modules:

a camera viewpoint video sequence selection module, whose input comprises a three-dimensional video sequence and camera viewpoint position information; the camera viewpoint position information indicates one camera viewpoint C's position of the three-dimensional video sequence; an output of the camera viewpoint video sequence selection module comprises one video sequence V1 of the stereoscopic pair; the camera viewpoint video sequence selection module accomplishes the processing that comprises choosing the viewpoint C of the three-dimensional video sequence as one video sequence V1 of the stereoscopic video pair;

a virtual viewpoint video sequence synthesis module, whose input comprises the three-dimensional video sequence, and virtual viewpoint position information, where the virtual viewpoint position information indicates the position of a virtual viewpoint P1, an output of the virtual viewpoint video sequence synthesis module comprises a video sequence V2 of the stereoscopic video pair; the virtual viewpoint video sequence synthesis module accomplishes the processing that comprises determining a virtual viewpoint P2 and synthesizing a virtual viewpoint video sequence of the virtual viewpoint P2 as a video sequence V2 of the stereoscopic video pair; the virtual viewpoint P2 is on a line between the camera viewpoint C and virtual viewpoint P2, and the distance between the virtual viewpoint P2 and the camera viewpoint C is S1/S2 times of the distance between the camera viewpoint C and virtual viewpoint P1, where S1 is a display scaling factor which indicates a ratio of horizontal resolution Res1 to horizontal width W1 of the stereoscopic display D1, and S2 is a source scaling factor which indicates a ratio of horizontal resolution Res2 to horizontal width W2 of a stereoscopic display D2.

16. The stereoscopic video pair generating apparatus according to claim 15 further comprises an image shifting module, whose input comprises a stereoscopic video pair Q1 composed by the video sequence V1 and video sequence V2, and image shifting information; the image shifting information indicates a number of pixels shifted horizontally (shifting pixel number X) in images of the two video sequences of the stereoscopic video pair that is constituted by the C and P1 viewpoint video sequences; an output of the image shifting module comprises a shifted stereoscopic video pair Q2, where the image shifting module accomplishes the processing that comprises the horizontal shifting of images of two video sequences of the stereoscopic video pair, and shifting pixel number X' is S1/S2 times of the shifting pixel number X, which is represented by the formula: X'=XS1/S2.

* * * * *